3,316,302
PREPARATION OF CYCLOHEXANOL AND
CYCLOHEXANONE
Johannes W. M. Steeman and Johan P. H. Von Den Hoff, Geleen, Netherlands, assignors to Stamicarbon N.V., Heerlen, Netherlands
No Drawing. Filed Jan. 24, 1964, Ser. No. 339,908
Claims priority, application Netherlands, Jan. 28, 1963, 288,272
3 Claims. (Cl. 260—586)

The present invention relates to the preparation of cyclohexanol and cyclohexanone by oxidation of cyclohexane in the liquid phase with a gas containing molecular oxygen. More particularly, the invention relates to certain improvements in recovering the cyclohexanol and cyclohexanone from the oxidation mixture.

The oxidation of cyclohexane to prepare cyclohexanol and cyclohexanone is conventionally carried out in such a way that only part of the cyclohexane, in most cases less than 25%, is converted. In addition to cyclohexanol and cyclohexanone, acid by-products, such as adipic acid and other carboxylic acids, as well as esters of these acids with cyclohexanol, are formed in the oxidation. To recover the desired compounds from the resulting oxidation product, it has been previously suggested in U.S. specification 3,047,629 to process the oxidation product by removing the nonconverted cyclohexane, saponifying the esters in the oxidation product with an aqueous alkaline solution, and, finally, separating off the cyclohexanol and cyclohexanone by steam distillation. The resulting distillate can then be separated into two phases; the cyclohexanol and cyclohexanone being recovered from the oil phase.

For use on an industrial scale, it would be highly advantageous if the abovementioned steam distillation could be avoided. This would be possible if the reaction mixture could be readily separated into an aqueous phase and an oil phase after the saponification. Unfortunately, however, such a phase separation is prevented by the formation of an emulsion after saponification. Hence, the steam distillation step has hitherto been considered essential.

The principal object of the present invention is to provide a process for recovering cyclohexanol and cyclohexanone whereby an effective two-phase separation is obtained without steam distillation as in prior practice. Other objects will also be hereinafter apparent from the following description of the invention.

According to the invention, the process for preparing cyclohexanol and cyclohexanone by oxidation of cyclohexane in the liquid phase with a gas containing molecular oxygen involves removal of acidic by-products of the oxidation by treatment with an aqueous alkaline solution, separation of the nonconverted cyclohexane from the reaction product, saponifying the esters present in the oxidation product with an aqueous alkaline solution, and finally, recovery of cyclohexanol and cyclohexanone from the reaction mixture, the process being characterized by the fact that after the saponification, cyclohexane is again added to the reaction mixture to form an aqueous phase and an oil phase and, subsequently, after removal of the aqueous phase, the cyclohexanol and cyclohexanone are recovered from the oil phase.

The present process offers a number of advantages over prior procedures. An important advantage, of course, is the elimination of the steam distillation step referred to above. Furthermore, if in contrast to the present process the nonconverted cyclohexane is not removed before the saponification, there is the drawback that the saponification has to be effected in relatively large reaction vessels. A further disadvantage of prior procedures is that, should it be desired to carry out the saponification reaction at a temperature above the boiling point of the cyclohexane-water azeotrope (68° C.), these large reaction vessels have to be operated at superatmospheric pressures. Moreover, the saponification is retarded due to the presence of cyclohexane. All of this is in sharp contrast to the present process wherein the saponification may be effected under atmospheric pressure using temperatures in the range of 50–100° C.

As a general rule, a 15–25% by weight solution of alkali metal hydroxide or alkali metal carbonate in water may be used as the aqueous alkaline solution for the saponification step of the present process. However, it is recommended first to use a carbonate solution and then a hydroxide solution, as in that case the esters are substantially completely converted. Advantageously sufficient of said alkaline solution is added to saponify essentially all of the esters present in the oxidation product.

According to the invention, cyclohexane is added to the reaction mixture after the saponification. It is then not required to add the total amount of cyclohexane separated from the reaction product of the cyclohexane oxidation. Preferably, 15–40% by weight of cyclohexane (based on the amount by weight of oil phase to be separated off) is employed, so that the use of very large vessels can be avoided. If smaller amounts of cyclohexane are used, it is more difficult to separate aqueous and oil phases.

Cyclohexanol, cylohexanone and cyclohexane can be recovered from the separated oil phase by distillation, and the separated cyclohexane can be re-used.

The separated aqueous phase can advantageously be used as an aqueous alkaline solution for the removal of acidic by-products from the initial oxidation product.

The invention is illustrated but not limited by the foregoing examples:

Example 1

1796 g. of the oxidation product obtained by oxidation of cyclohexane with air-oxygen after separation of the residual gas of the oxidation, and removal of the nonconverted cyclohexane by distillation at atmospheric pressure, were introduced into a 5-liter reaction vessel provided with a stirrer.

After addition of a solution of 194 g. of sodium carbonate in 775 g. of water, the reaction mixture was stirred for one hour, at 60° C., while the resulting carbon dioxide was discharged. A solution of 123 g. of sodium hydroxide in 289 g. of water was then added, and the reaction mixture stirred for half an hour.

Thereafter, 540 g. of cyclohexane were mixed with the reaction mixture at a temperature of 40° C., after which the resulting water layer was separated from the oil layer in a separator. Organic products contained in the water layer were extracted with cyclohexane, and the extract was added to the oil layer. The oil layer was washed with water, at 40° C., in a wash column packed with Raschig rings.

The washed oil layer was then distilled, the water residue and the cyclohexane being first separated off in a predistillation, after which cyclohexanol and cyclohexanone (collective weight 1265 g.) were separated together from the higher-boiling residue (174 g.) in a distillation column (56 theoretical trays, reflux ratio 1).

Example 2

The oxidation product obtained by oxidation of cyclohexane with air oxygen after separation of acidic by-product of the oxidation by washing with an aqueous alkaline solution and substantially complete removal of the nonconverted cyclohexane by distillation, was successively passed, at the rate of 100 kg. per hour, through ur reaction vessels provided with a stirrer and a reflux cooler and heated at 90 to 95° C.

The residence time in the first reaction vessel was one hour, that in the following vessels one quarter of an hour. 20% by weight aqueous sodium carbonate solution was fed into the first reaction vessel at the rate of 40 liters per hour, and a 20% by weight aqueous sodium hydroxide solution was fed into the second reaction vessel at the rate of 7.5 liters per hour.

At the rate of 30 kg. per hour, cyclohexane was continuously added to the turbid liquid mixture issuing from the fourth reaction vessel. The resulting mixture was continuously fed into a separator, from which, after a residence time of about 2 minutes at 40° C., the aqueous phase and the oil phase were discharged separately. The aqueous phase was used as aqueous alkaline solution for the removal of acidic by-products from the initial oxidation product.

The oil phase was continuously washed in countercurrent relation to water at a temperature of 40–50° C., and, subsequently, distilled. In this distillation the water residue and the cyclohexane, and also cyclohexanol and cyclohexanone, were first separated from the higher-boiling residue. Then in a redistillation cyclohexanol and cyclohexanone were separated at a distillation pressure and a distillation temperature adapted to the boiling points of cyclohexanol and cyclohexanone, which differ slightly. The yield per hour amounted to 44 kg. of cyclohexanol and 27 kg. of cyclohexanone.

It will be appreciated that various modifications may be made in the invention described above. Accordingly, the scope of the invention is defined in the following claims wherein we claim:

1. In a process for recovering cyclohexanol and cyclohexanone prepared by oxidizing cyclohexane in the liquid phase with a gas containing molecular oxygen, removing acidic by-products by treating the oxidation product with an aqueous alkaline solution, removing substantially all of the nonconverted cyclohexane from the oxidation product by distillation, subsequently saponifying substantially all of the esters present in the oxidation product at atmospheric pressure with an aqueous alkaline solution, and, finally recovering cyclohexanol and cyclohexanone from the reaction mixture, the improvement which comprises adding cyclohexane, in an amount corresponding to 15–40% by weight of the oil phase to be separated off, to the reaction mixture after the saponification whereby an oil phase and a water phase are formed, separating the water phase from the oil phase and thereafter recovering the cyclohexanol and cyclohexanone from the oil phase.

2. The process of claim 1 wherein the cyclohexanone and cyclohexanol are separated from the oil phase by distillation.

3. The process of claim 1 wherein the saponification is carried out at a temperature in the range of 50–100° C.

References Cited by the Examiner

UNITED STATES PATENTS

| | | | |
|---|---|---|---|
| 2,931,834 | 4/1960 | Crouch et al. | 260—586 |
| 3,047,629 | 7/1962 | Steeman | 260—586 |
| 3,179,699 | 4/1965 | Waldmann et al. | 260—586 |

LEON LITVER, *Primary Examiner.*

MATTHEW M. JACOB, *Assistant Examiner.*